US008730191B2

United States Patent
Kim et al.

(10) Patent No.: US 8,730,191 B2
(45) Date of Patent: May 20, 2014

(54) TOUCH SCREEN PANEL PROTECTED AGAINST FAILURE DUE TO STATIC ELECTRICITY

(75) Inventors: Chang-Yeop Kim, Yongin (KR); Won-Kyu Kwak, Yongin (KR); Jeong-Yeol Lee, Yongin (KR); Gyoo-Chul Jo, Yongin (KR); Jung-Ho Choi, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 395 days.

(21) Appl. No.: 13/048,727

(22) Filed: Mar. 15, 2011

(65) Prior Publication Data

US 2012/0098762 A1 Apr. 26, 2012

(30) Foreign Application Priority Data

Oct. 26, 2010 (KR) .......................... 10-2010-0104701

(51) Int. Cl.
*G06F 3/046* (2006.01)
*G06F 3/047* (2006.01)
(52) U.S. Cl.
CPC ...................................... *G06F 3/046* (2013.01)
USPC ........................................ 345/173; 178/18.07
(58) Field of Classification Search
CPC .................................. G06F 3/046; G06F 3/047
USPC ..................... 345/173–178; 178/18.01–18.08
See application file for complete search history.

(56) References Cited

U.S. PATENT DOCUMENTS

| 2009/0184937 | A1 | 7/2009 | Grivna |
| 2009/0262096 | A1* | 10/2009 | Teramoto ...................... 345/174 |
| 2010/0134436 | A1* | 6/2010 | Jeong et al. ................... 345/174 |
| 2010/0265207 | A1* | 10/2010 | Chen ............................. 345/174 |
| 2010/0321327 | A1* | 12/2010 | Liu ................................ 345/174 |
| 2011/0141042 | A1* | 6/2011 | Kim et al. ..................... 345/173 |

FOREIGN PATENT DOCUMENTS

| JP | 2008-310550 | 12/2008 |
| KR | 10-2010-0061993 A | 6/2010 |

OTHER PUBLICATIONS

Korean Office Action dated Sep. 30, 2013 of the Korean Patent Application No. 10-2010-0104701. With its English translation.

* cited by examiner

*Primary Examiner* — Srilakshmi K Kumar
*Assistant Examiner* — James Nokham
(74) *Attorney, Agent, or Firm* — Robert E. Bushnell, Esq.

(57) ABSTRACT

A touch screen panel comprises a plurality of first sensing cells connected along a first direction on a transparent substrate, and a plurality of second sensing cells disposed between respective first sensing cells and connected along a second direction. A plurality of first connection patterns connects the first sensing cells along the first direction and a plurality of second connection patterns connects the second sensing cells along the second direction A plurality of static electricity induction patterns are connected to the first or second sensing cells and extend in a direction toward a sensing cell adjacent to a sensing cell to which each of the static electricity induction patterns is connected so that its end portion overlaps the neighboring sensing cell. A first insulating layer is interposed between the first and second patterns, and between the static electricity induction patterns and the neighboring sensing cell.

20 Claims, 9 Drawing Sheets

TOUCH SCREEN PANEL PROTECTED AGAINST FAILURE DUE TO STATIC ELECTRICITY

CLAIM OF PRIORITY

This application makes reference to, incorporates the same herein, and claims all benefits accruing under 35 U.S.C. §119 from an application earlier filed in the Korean Intellectual Property Office on Oct. 26, 2010 and there duly assigned Serial No. 10-2010-0104701.

BACKGROUND OF THE INVENTION

1. Field of the Invention

The present invention relates to a touch screen panel and, more particularly, to a touch screen panel which is protected against failure due to static electricity.

2. Description of the Related Art

A touch screen panel is an input device which allows a user's instruction to be inputted by selecting an instruction content displayed on a screen of an image display or the like with a user's hand or object.

To this end, the touch screen panel is formed on a front face of the image display so as to convert a contact position into an electrical signal. In the latter regard, the user's hand or object is directly in contact with the touch screen panel at the contact position. Accordingly, the instruction content selected at the contact position is inputted as an input signal to the image display.

Since such a touch screen panel can be substituted for a separate input device connected to an image display, such as a keyboard or mouse, its fields of application have been gradually extended.

Touch screen panels are divided into a resistive overlay touch screen panel, a photosensitive touch screen panel, a capacitive touch screen panel, and the like.

Among these touch screen panels, the capacitive touch screen panel converts a contact position into an electrical signal by sensing a change in capacitance formed between a conductive sensing cell and an adjacent sensing cell, a ground electrode or the like when a user's hand or object is in contact with the touch screen panel.

In this case, in order to clearly detect a contact position at a contact surface, the sensing cells include first sensing cells connected along a first direction by first connection patterns and second sensing cells connected along a second direction by second connection patterns.

Generally, first and second connection patterns intersect while being insulated from each other with an insulating layer interposed therebetween. The first and second connection patterns have a narrower width than patterns in the sensing cells themselves, and thus the resistance of the first and second connection patterns is relatively larger than that of the sensing cells. Therefore, the intersection portions of the first and second connection patterns may be easily damaged by static electricity.

In a case where damage, such as insulation breakdown or disconnection due to static electricity, occurs at an intersection portion of the first and second connection patterns, a driving failure of the touch screen panel is caused.

SUMMARY OF THE INVENTION

The present invention provides a touch screen panel which is protected against failure due to static electricity.

According to an aspect of the present invention, a touch screen panel comprises: a transparent substrate; a plurality of first sensing cells connected along a first direction on the transparent substrate; a plurality of second sensing cells disposed between the respective first sensing cells and connected along a second direction; a plurality of first connection patterns which connect the first sensing cells along the first direction; a plurality of second connection patterns which connect the second sensing cells along the second direction; a plurality of static electricity induction patterns connected to the first or second sensing cells and extending in a direction toward a sensing cell neighboring to a sensing cell to which each of the static electricity induction patterns is connected so that its end portion overlaps the neighboring sensing cell; and a first insulating layer interposed between the first and second patterns, and between the static electricity induction patterns and the neighboring sensing cell.

The first connection patterns may have patterns separated from the first sensing cells, and connect the first sensing cells by the line along the first direction while being electrically connected to the first sensing cells at upper or lower portion of the first sensing cells.

The static electricity induction patterns may be formed of the same material in the same layer as the first connection patterns.

Each of the static electricity induction patterns may be diverged from one region of the first connection pattern so that the static electricity induction patterns are integrally formed with the first connection pattern.

Two of the static electricity induction patterns may be diverged from the one region of the first connection pattern so that the static electricity induction patterns are integrally formed with the first connection patterns.

The first connection patterns may be connected to the first sensing cells through first contact holes formed in the first insulating layer at the upper or lower portion of the first sensing cells.

Each of the static electricity induction patterns may be diverged from a region of the first connection pattern, in which the first contact holes are formed, so that the static electricity induction patterns are integrally formed with the first connection pattern.

The static electricity induction patterns may be disposed in the same layer as the first connection patterns, and have patterns separated from the first connection patterns.

The static electricity induction patterns may be formed of the same material as the first connection patterns.

The static electricity induction patterns may be disposed adjacent to the first connection pattern and a connection portion of the first sensing cells.

The first connection patterns may be electrically connected to the first sensing cells through the first contact holes formed in the first insulating layer at the upper or lower portion of the first sensing cells, and the static electricity induction patterns may be electrically connected to the first or second sensing cells through second contact holes formed in the first insulating layer at an upper or lower portion of the first or second sensing cells.

The first and second contact holes may be disposed adjacent to each other, and the number of second contact holes which connect one first or second sensing cell to one static electricity induction pattern may be greater than that of first contact holes which connect one first sensing cell to one first connection pattern.

The static electricity induction patterns may be spaced apart from the first and second connection patterns at a predetermined distance or more.

The static electricity induction patterns may be disposed at end portions different from end portions of the first and second sensing cells, connected by the first and second connection patterns.

The static electricity induction patterns may include first static electricity induction patterns connected to the first sensing cells so as to be extended in a direction toward a second sensing cell adjacent to a first sensing cell to which each of the first static electricity induction patterns is connected, and second static electricity induction patterns connected to the second sensing cells so as to be extended in a direction toward a first sensing cell adjacent to a second sensing cell to which each of the second static electricity induction patterns is connected.

The touch screen panel may further include outer lines for connecting the first sensing cells by the line along the first direction and the second sensing cells by the line along the second direction to an external driving circuit. The first connection patterns and the static electricity induction patterns may be formed of the same material in the same layer as the outer lines.

The outer lines, the first connection patterns and the static electricity induction patterns may be formed of a metallic material.

The first sensing cells, the second sensing cells and the second connection patterns may be formed of a transparent electrode material, and the first connection patterns and the static electricity induction patterns may be formed of an opaque metallic material so as to have a narrower width than the second connection patterns.

The transparent substrate may be set as an upper substrate of a display panel so as to be integrally formed with the display panel.

The first insulating layer may be set as an inorganic insulating layer entirely formed on a touch active area in which the first and second sensing cells are formed.

As described above, according to the embodiments of the present invention, static electricity induction patterns are connected to first or second sensing cells and extend in the direction toward a sensing cell adjacent to the sensing cell to which each of the static electricity induction patterns is connected so that the end portion of the static electricity induction pattern overlaps the neighboring sensing cell, thereby preventing driving failure of the touch screen panel caused by static electricity.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
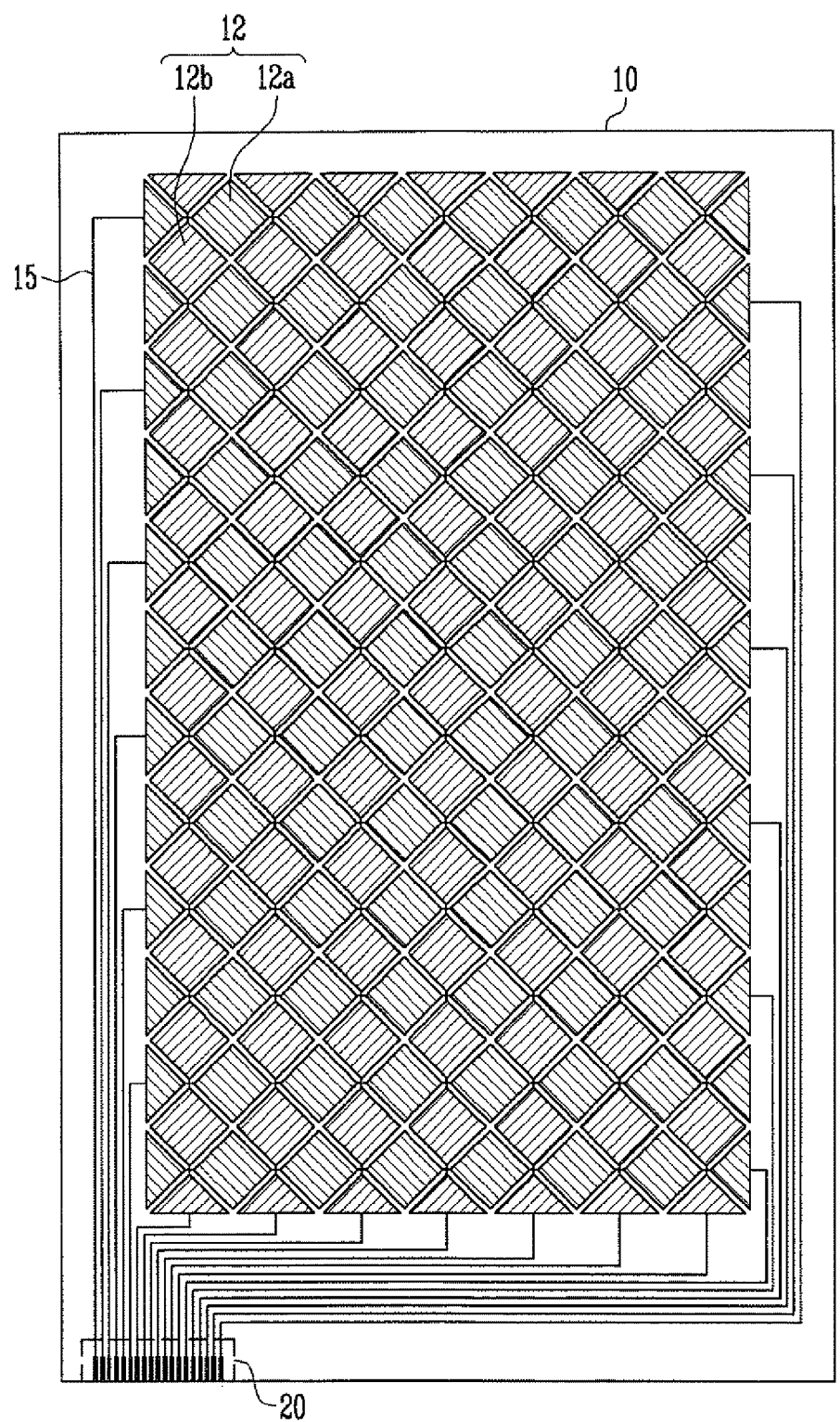
FIG. 1 is a plan view schematically showing a first example of a touch screen panel.

In the following detailed description, only certain exemplary embodiments of the present invention have been shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the another element with one or more intervening elements interposed therebetween. Also, when an element is referred to as being "connected to" another element, it can be directly connected to the another element or be indirectly connected to the other element with one or more intervening elements interposed therebetween. Hereinafter, like reference numerals refer to like elements.

Exemplary embodiments of the present invention will now be described in detail with reference to the accompanying drawings.

FIG. 1 is a plan view schematically showing an example of a touch screen panel.

Referring to FIG. 1, the touch screen panel includes a transparent substrate 10, sensing cells 12 formed in a touch active area on the transparent substrate 10, and outer lines 15 formed in a non-touch active area at the outside of the touch active area so as to connect the sensing cells 12 to an external driving circuit through a pad portion 20.

The sensing cells 12 include a plurality of first sensing cells 12a distributively arranged in the touch active area on the transparent substrate 10, and formed so as to be electrically connected along a first direction, and a plurality of second sensing cells 12b distributively arranged between the first sensing cells 12a and formed so as to be electrically connected along a second direction intersecting the first direction.

That is, the first and second sensing cells 12a and 12b, respectively, are alternately arranged so as to be connected along different directions from each other. For example, the first sensing cells 12a are connected along a row direction (horizontal direction), and row lines of the first sensing cells 12a are connected to the respective outer lines 15. The second sensing cells 12b are connected along a column direction (vertical direction), and column lines of the second sensing cells 12b are connected to the respective outer lines 15.

The first and second sensing cells 12a and 12b, respectively, are formed of a transparent electrode material such as indium tin oxide (ITO) so that light from a display panel (not shown), disposed below the first and second sensing cells 12a and 12b, respectively, can be transmitted to the first and second sensing cells 12a and 12b, respectively.

Meanwhile, although only simple lines are shown in FIG. 1 without designating reference numerals, a plurality of first connection patterns and a plurality of second connection patterns are further formed in the touch active area on the transparent substrate 10. In this case, the plurality of first connection patterns are arranged along the first direction (e.g., the row direction) so as to connect the first sensing cells 12a to one another along the first direction. The plurality of second connection patterns are arranged along the second direction (e.g., the column direction) so as to connect the second sensing cells 12b to one another along the first direction. Embodiments of the connection patterns and detailed descriptions thereof will be provided below.

The outer lines 15 are used to connect the first and second sensing cells 12a and 12b, respectively, arranged in a line along the first and second directions, respectively, to an external driving circuit. For example, the outer lines are electrically connected to the row lines of the first sensing cells 12a and the column lines of the second sensing cells 12b, respectively, so that the first and second sensing cells 12a and 12b, respectively, are connected to an external driving circuit (not shown), such as a position detecting circuit, through the pad portion 20.

The outer lines 15 are arranged in the non-touch active area, which is an outer portion of the touch screen panel except for the touch active area in which images are displayed. The material of the outer lines 15 is selected from a wide range. Therefore, the outer lines 15 may be formed of not only a transparent electrode material used to form the sensing cells 12, but also a low-resistance metallic material, such as molybdenum (Mo), silver (Ag), titanium (Ti), copper (Cu), aluminum (Al) or molybdenum/aluminum/molybdenum (Mo/Al/Mo).

The touch screen panel, configured as described above, is a capacitive touch screen panel. If a contact object, such as a user's finger or stylus pen, comes into contact with the touch screen panel, a change in capacitance caused by the contact position is transferred from the sensing cells 12 to the driving circuit (not shown) via the outer lines 15 and the pad portion 20. Then, the change in capacitance is converted into an electrical signal by X and Y input processing circuits (not shown), thereby detecting the contact position.

Figure 2:
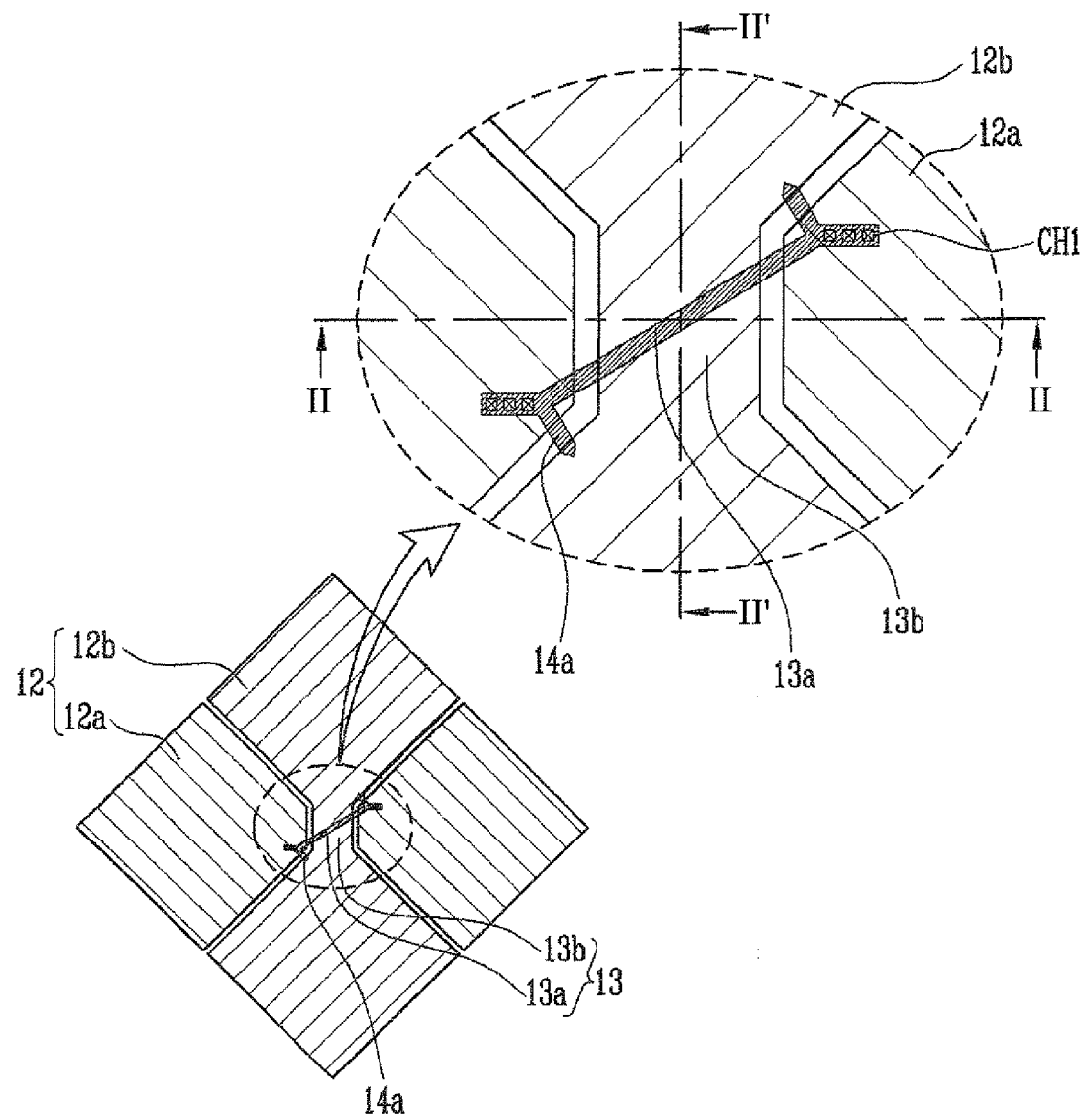
FIG. 2 is a plan view showing sensing cells, connection patterns and static electricity induction patterns of a touch screen panel according to a first embodiment of the present invention.
Figure 3A:
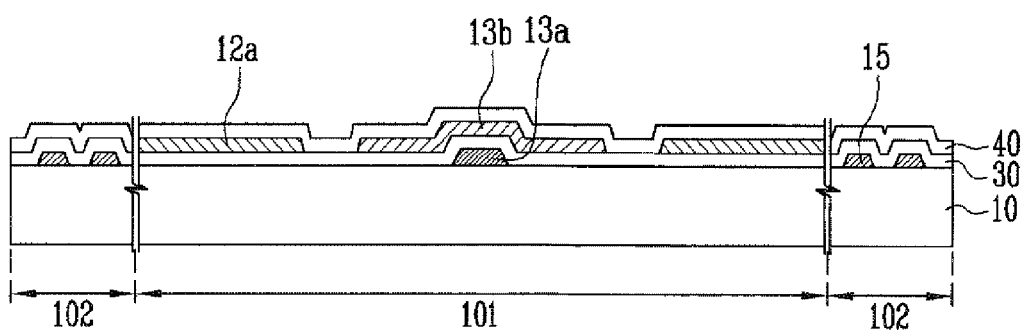
FIGS. 3A and 3B are main part sectional views of the touch screen panel taken along lines II-II and II'-II' of FIG. 2.
Figure 3B:
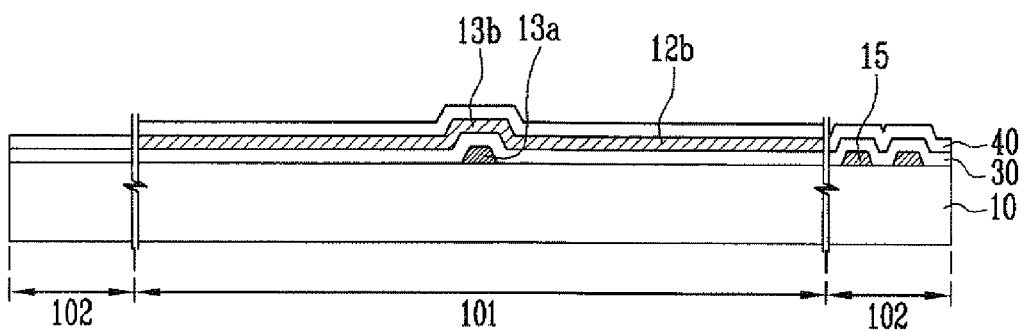

FIG. 2 is a plan view showing sensing cells, connection patterns and static electricity induction patterns of a touch screen panel according to a first embodiment of the present invention; FIGS. 3A and 3B are main part sectional views of the touch screen panel taken along lines II-II and II'-II' of FIG. 2; and FIGS. 4 and 5 are plan views showing modifications of the static electricity induction patterns shown in FIG. 2.

Figure 4:
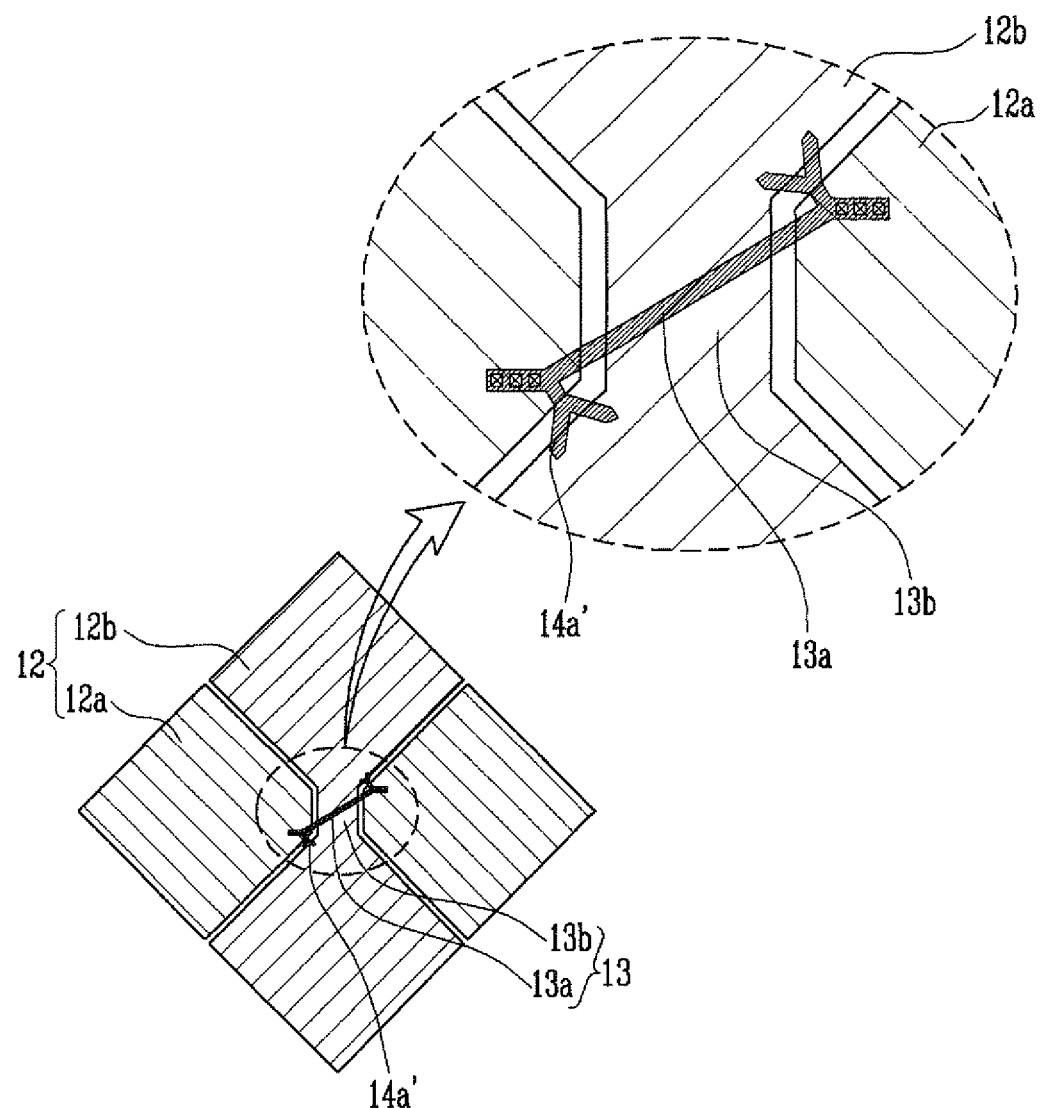
FIGS. 4 and 5 are plan views showing modifications of the static electricity induction patterns shown in FIG. 2.
Figure 5:
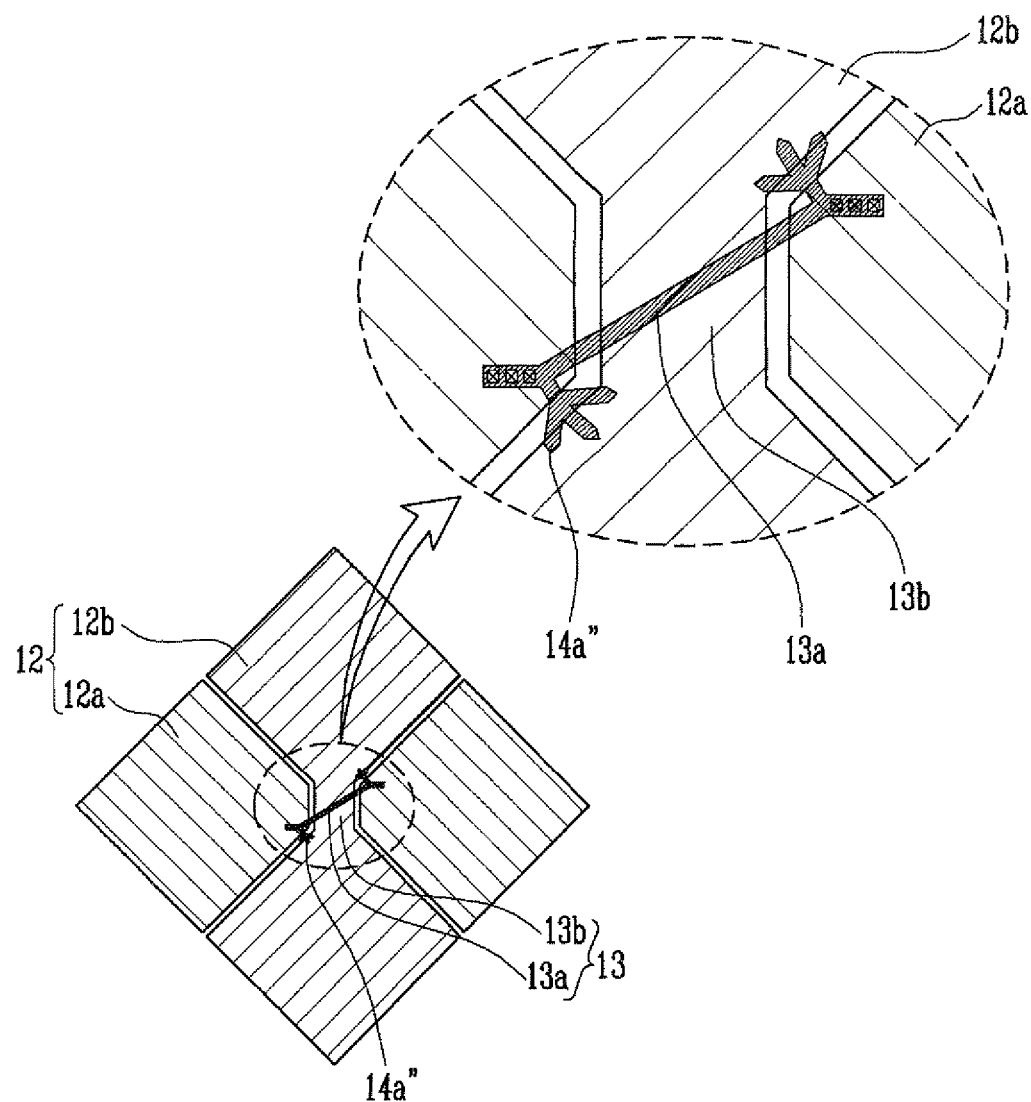

For convenience of illustration, only adjacent two first sensing cells 12a, a first connection pattern 13a which connects the first sensing cells 12a to each other, adjacent two second sensing cells 12b, and a second connection pattern 13b which connects the second sensing cells 12a to each other are shown in FIGS. 2, 4 and 5. However, an actual touch screen panel has a structure in which the structure shown in FIG. 2 is repeatedly disposed in the touch active area. Therefore, a plurality of first connection patterns 13a and a plurality of second connection patterns 13b will be represented in the following description.

FIGS. 2, 3A and 3B will be described in conjunction with FIG. 1. The touch screen panel according to this embodiment includes: a transparent substrate 10; a plurality of first sensing cells 12a and a plurality of second sensing cells 12b, respectively connected along first and second directions, respectively, in a touch active area 101 on the transparent substrate 10; a plurality of first connection patterns 13a which connect the first sensing cells 12a to one another along the first direction; a plurality of second connection patterns 13b which connect the second sensing cells 12b to one another along the second direction; and a first insulating layer 30 interposed between the first connection patterns 13a and the second connection patterns 13b to ensure insulating properties.

The first insulating layer 30 may be partially disposed between components, the insulating properties of which are necessarily ensured. However, as shown in FIGS. 3A and 3B, the first insulating layer 30 may be entirely formed on the touch active area 101 in which the sensing cells 12 are formed.

According to the design structure, the touch screen panel may further include a second insulating layer 40 entirely formed on the touch screen panel so as to protect the patterns formed on the transparent substrate 10.

In the latter regard, the touch active area 101, in which the first and second sensing cells 12a and 12b and the first and second connection patterns 13a and 13b are formed, is generally formed so as to overlap an image display surface of a display panel (not shown) disposed below the touch active area 101. The touch active area 101 is transparent so that an image from a part of the display panel can be visualized.

To this end, the first and second sensing cells 12a and 12b, respectively, are formed of a transparent electrode material, such as ITO. The first connection patterns 13a and/or the second connection patterns 13b are formed of a transparent electrode material like the first and second sensing cells 12a and 12b, respectively, or are formed of a low-resistance opaque metallic material. The width, thickness or length of the first connection patterns 13a and/or the second connection patterns 13b may be adjusted to prevent them from being visualized.

For example, the first connection patterns 13a may be formed of a low-resistance opaque metallic material, and the second connection patterns 13b may be formed of a transparent electrode material together with the first and second sensing cells 12a and 12b, respectively.

In this case, the first sensing cells 12a may have patterns separated from each other between the second sensing cells 12b. The first sensing cells 12a may be connected along the first direction by the first connection patterns 13a.

In this instance, the first connection patterns 13a may be separately patterned in an upper or lower layer of the first sensing cells 12a connected by the first connection patterns 13a. As shown in FIG. 2, both end portions of each of the first connection patterns 13a may be electrically connected to adjacent first sensing cells 12a through first contact holes CH1 formed in the first insulating layer 30, so that the first sensing cells 12a can be connected in a line along the first direction.

One or more first contact holes CH1 are formed in the connection of one first connection pattern 13a to one first sensing cell 12a. In this instance, two or more first contact holes CH1 may be formed so as to decrease contact resistance. The number of first contact holes CH1 may be controlled in consideration of contact resistance, visibility and the like.

In this embodiment, the first sensing cells 12a and the first connection patterns 13a are not necessarily connected through the contact holes CH1. In a case where the first insulating layer 30 is locally formed in a region, the insulating property of which is necessarily ensured, such as an intersection portion of the first and second connection patterns 13a and 13b, respectively, the first sensing cells 12a and first connection patterns 13a may be connected through direct contacts.

Meanwhile, in a case where the second connection patterns 13b are formed of a transparent electrode material, the second sensing cells 12b and the second connection patterns 13b are integrally patterned for each line along the second direction from a patterning process of the transparent electrode material, thereby simplifying the process.

In a case where the first connection patterns 13a are formed of a low-resistance opaque metallic material, the first connection patterns 13a and the outer lines 15 are simultaneously formed in a process of forming the outer lines 15 arranged in the non-touch active area 102, thereby simplifying the process. That is, the first connection patterns 13a may be formed of the same material in the same layer as the outer lines 15.

In the case of the first connection patterns 13a being formed of the low-resistance opaque metallic material, the width of the first connection patterns 13a is limited so that it is possible to prevent the first connection patterns 13a from being visualized. Thus, the width of the first connection patterns 13a is narrower than that of the second connection patterns 13b formed of the transparent electrode material. Alternatively, the first connection patterns 13a may be inclined in a diagonal direction so that visualization can be more effectively prevented.

That is, the first connection patterns 13a are necessarily designed to be narrow in consideration of visibility. In this case, failures are easily generated in the first connection patterns 13a by static electricity concentrated on the intersecting portions of the first and second connection patterns 13a and 13b, respectively, thereby resulting in a driving failure of the touch screen panel.

Accordingly, this embodiment is conceived so as to prevent driving failure of the touch screen panel due to static electricity. In this embodiment, there are formed a plurality of static electricity induction patterns 14a electrically connected to first sensing cells 12a or second sensing cells 12b (first sensing cells 12a in FIG. 2), respectively. In this case, each of the static electricity induction patterns 14a is extended in the direction toward a sensing cell 12b adjacent to the sensing cell 12a to which the static electricity pattern 14a itself is connected so that its end portion overlaps the neighboring sensing cell 12a. In this instance, the insulating layer 30 for ensuring stability is interposed between the static electricity induction patterns 14a and the neighboring sensing cells 12a.

The static electricity induction patterns 14a may be formed of the same material in the same layer as the first connection patterns 13a so as to simplify the process.

For example, the static electricity induction patterns 14a may be integrally formed with each of the first connection patterns 13a. As shown in FIG. 2, each of the static electricity induction patterns 14a may diverge from one region of the first connection pattern 13a so that the static electricity patterns 14a are integrally formed with the first connection pattern 13a.

Particularly, each of the static electricity induction patterns 14a diverges from a region in which the first contact holes CH1 of the first connection pattern 13a are formed so that the static electricity inductor patterns 14a are integrally formed with the first connection pattern 13a, thereby effectively inducing static electricity.

In this instance, the static electricity patterns 14a may be formed of a low-resistance opaque metallic material like the first connection patterns 13a and the outer lines 15. Therefore, the static electricity patterns 14a may also have a narrower width than the transparent second connection patterns 13b, like the first connection patterns 13a.

The end portion of each of the static electricity induction patterns 14a overlaps a sensing cell 12b adjacent to a sensing cell 12a to which the static electricity induction pattern 14a is connected. Therefore, a capacitor is formed between the static electricity induction pattern 14a and the adjacent sensing cell 12b. In this instance, the capacitance formed by the static electricity induction patterns 14a may be designed to be relatively smaller than that formed at an intersection portion of the first and second connection patterns 13a and 13b, respectively. Accordingly, static electricity generated in the vicinity of the intersection portion of the first and second connection patterns 13a and 13b, respectively, can be effectively induced into the static electricity induction patterns 14a.

If the static electricity is induced into the static electricity induction patterns 14a as described above, it is possible to ensure the stability of the first and second connection patterns 13a and 13b, respectively. Although damage, such as disconnection, is applied to the static electricity induction patterns 14a, it has no influence on the driving of the touch screen panel.

As described above, according to this embodiment, there are formed a plurality of static electricity induction patterns 14a electrically connected to first sensing cells 12a or second sensing cells 12b, respectively (the embodiment in which the plurality of static electricity induction patterns 14a are respectively connected to first sensing cells 12a is disclosed in FIG. 2), and each of the static electricity induction patterns 14a is extended in a direction toward a sensing cell 12b adjacent to the sensing cell 12a to which the static electricity pattern 14a itself is connected so that its end portion overlaps the adjacent sensing cell 12a, thereby preventing driving failure of the touch screen panel due to static electricity.

That is, in this embodiment, there is provided a touch screen panel having a structure which is strong against static electricity by forming metal bridge patterns of an opaque metallic material. That is, the static electricity induction patterns 14a are formed of the same material in the same layer as the first connection patterns 13a, and are electrically connected to the first or second sensing cells 12a or 12b, respectively.

In this case, since it is sufficient to form only one first connection pattern 13a in the connection of adjacent first sensing cells 12a, it is advantageous in view of visibility.

The touch screen panel according to this embodiment may be usefully applied to a structure in which a touch screen panel and a display panel are integrated with each other by forming touch patterns, such as the first and second sensing cells 12a and 12b, respectively, and the first and second connection patterns 13a and 13b, respectively, directly on the display panel.

More specifically, the transparent substrate 10 of the touch screen panel is implemented as an upper substrate of the display panel, and the touch sensing patterns including the first and second sensing cells 12a and 12b, respectively, and the first and second connection patterns 13a and 13b, respectively, are formed on one surface of the upper substrate of the display panel, thereby providing a display panel with an integrated touch screen panel. In this case, the thickness of the first insulating layer 30 between the first and second connection patterns 13a and 13b, respectively, may be limited.

For example, in a case where the display panel is implemented as an organic light emitting display panel or the like, of which the upper and lower substrates are sealed by a frit, the first insulating layer 30 may be formed as a thick organic insulating layer. In this case, the organic insulating layer may be broken by a high frit firing temperature, and therefore, the organic insulating layer may be replaced by an inorganic insulating layer.

That is, in a case where the transparent substrate 10, as a base material of the touch screen panel, is implemented as the upper substrate of the display panel so that the touch screen panel and the display panel are integrated with each other, the first insulating layer 30 may be designed as an inorganic insulating layer entirely formed in the touch active area 101 in which the first and second sensing cells 12a and 12b, respectively, and the first and second connection patterns 13a and 13b, respectively. In this case, the thickness of the inorganic insulating layer is limited due to layer stress as compared with the organic insulating layer.

Therefore, since the thickness of the first insulating layer 30 implemented as an inorganic insulating layer is limited, the first insulating layer 30 may be weak relative to the static electricity. However, if the static electricity induction patterns 14a are formed as described in this embodiment, the weakness to static electricity is improved. Thus, the touch screen panel according to this embodiment can be usefully applied to the structure in which the touch screen panel and the display panel are integrated with each other.

Meanwhile, although it has been illustrated in FIG. 2 that the static electricity induction patterns 14a diverge from both ends of the first connection pattern 13a, respectively, the present invention is not limited thereto.

That is, each of the static electricity induction patterns 14a diverges from one region of the first connection pattern 13a so that the static electricity induction patterns 14a are integrally formed with the first connection pattern 13a. The number of static electricity induction patterns 14a which diverge from the first connection pattern 13a may be variously modified.

For example, two static electricity induction patterns 14a' may be diverge from each of both ends of the first connection pattern 13a as shown in FIG. 4, or three static electricity induction patterns 14a" may be formed to be diverged from each of both the ends of the first connection pattern 13a as shown in FIG. 5. The number of static electricity induction patterns may be properly designed in consideration of static electricity induction and visibility.

Figure 6:
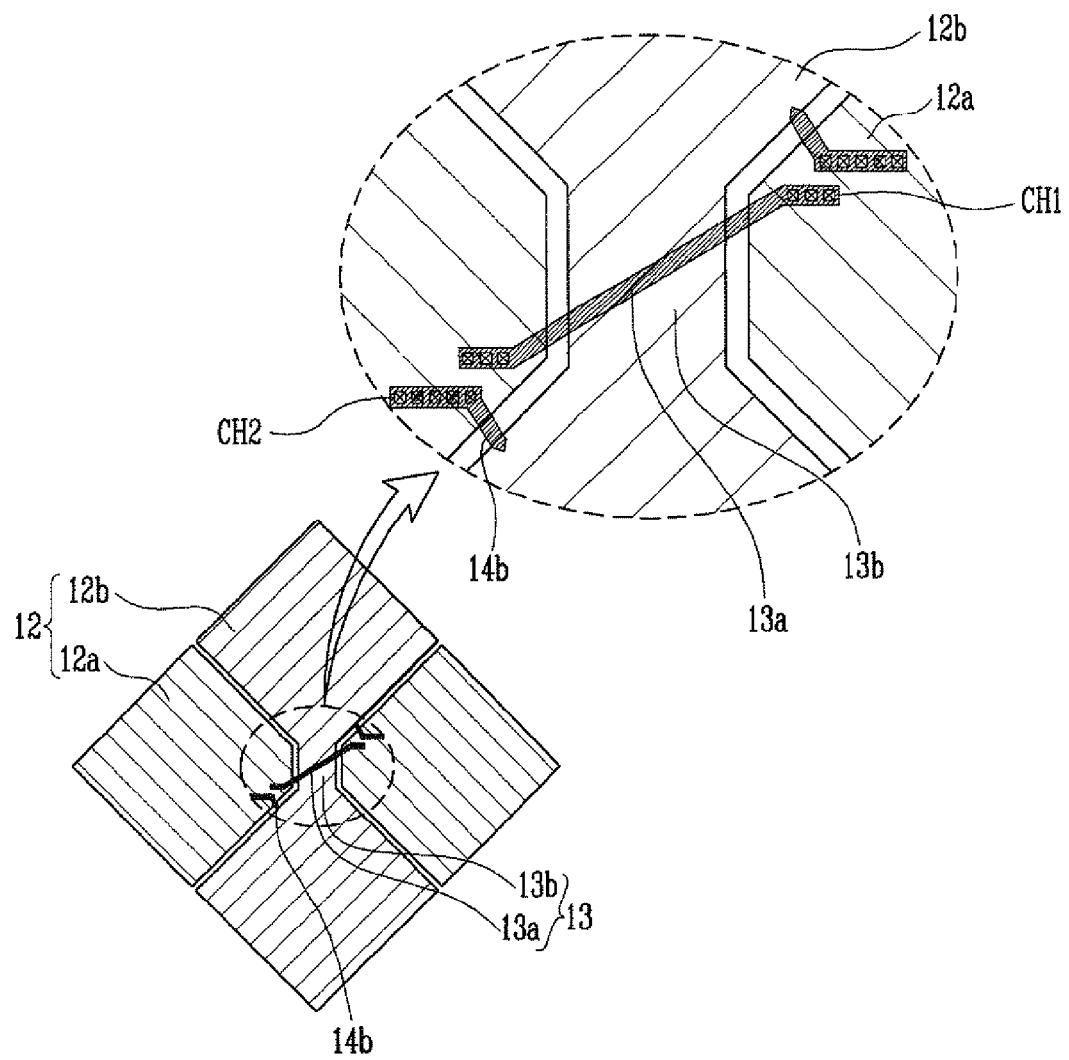
FIG. 6 is a plan view showing sensing cells, connection patterns and static electricity induction patterns of a touch screen panel according to a second embodiment of the present invention.

FIG. 6 is a plan view showing sensing cells, connection patterns and static electricity induction patterns of a touch screen panel according to a second embodiment of the present invention. In the description of FIG. 6, components identical or similar to those of FIG. 2 are designated by the same reference numerals, and their detailed descriptions will be omitted.

Referring to FIG. 6, the static electricity induction patterns 14b according to this embodiment are formed in the same layer as the first connection patterns 13a. In this instance, the static electricity induction patterns 14b are spaced apart from the first connection patterns 13a so as to have patterns separated from the first connection patterns 13a. However, the static electricity induction patterns 14b may be simultaneously formed of the same material as the first connection patterns 13a for convenience of process.

The static electricity induction patterns 14b may be disposed adjacent to the first connection pattern 13a and a connection portion of the first sensing cells 12a.

In this case, the number of second contact holes CH2 for connecting the static electricity induction pattern 14b to the first sensing cell 12a may be greater than that of first contact holes CH1 for connecting the first connection pattern 13a to the first sensing cell 12a.

More specifically, the first connection pattern 13a is connected to the first sensing cells 12a at an upper or lower portion of the first sensing cells 12a through the first contact holes CH1 formed in the first insulating layer (30 of FIGS. 3A and 3B) interposed therebetween. The static electricity induction patterns 14b are electrically connected to the first or second sensing cells 12a or 12b, respectively, at upper or lower portion, respectively, of the first or second sensing cells 12a or 12b, respectively, (the first sensing cells 12a in FIG. 6) through the second contact holes CH 2 formed in the insulating layer.

Meanwhile, in FIG. 6, all of the static electricity induction patterns 14b are connected to the respective first sensing cells 12a so as to form a capacitor with the second sensing cell 12b adjacent to the first sensing cell to which each of the static electricity induction patterns 14b is connected. However, the present invention is not limited thereto.

That is, in a case where the first connection pattern 13a and the static electricity induction patterns 14b are separated from each other, each of the static electricity induction patterns 14b is connected to the second sensing cell 12b so as to form a capacitor with the first sensing cell 12a adjacent to the second sensing cell 12b, to which the static electricity induction pattern 14b is connected.

There may be formed static electricity induction patterns (first static electricity induction patterns) respectively connected to the first sensing cells 12a and static electricity induction patterns (second static electricity induction patterns) respectively connected to the second sensing cells 12b. In this case, static electricity flowing not only through an X-line, but also through a Y-line, may be induced into the static electricity induction patterns.

In this instance, the first and second contact holes CH1 and CH2, respectively, are disposed in adjacent regions to each other. The number of second contact holes CH2 for connecting one first or second sensing cell 12a or 12b, respectively, to one static electricity induction pattern 14b may be greater than that of first contact holes CH1 for connection of one first sensing cell 12a to one first connection pattern 13a.

In this case, the contact resistance between the first or second sensing cell 12a or 12b, respectively, and the static electricity induction pattern 14b is smaller than that between the first sensing cell 12a and the first connection pattern 13a. Thus, static electricity generated in the vicinity of the first and second contact holes CH1 and CH2, respectively, is more effectively induced to the static electricity induction patterns 14b.

In a case where the first connection pattern 13a and the static electricity induction pattern 14b are disposed adjacent to each other, the region in which they are disposed and the spacing distance therebetween may be designed in consideration of visibility. Particularly, the first connection pattern 13a and the static electricity induction pattern 14b may not be concentrated on a light emitting portion of the same pixel so that the pixel is not recognized as a dark point.

Figure 7:
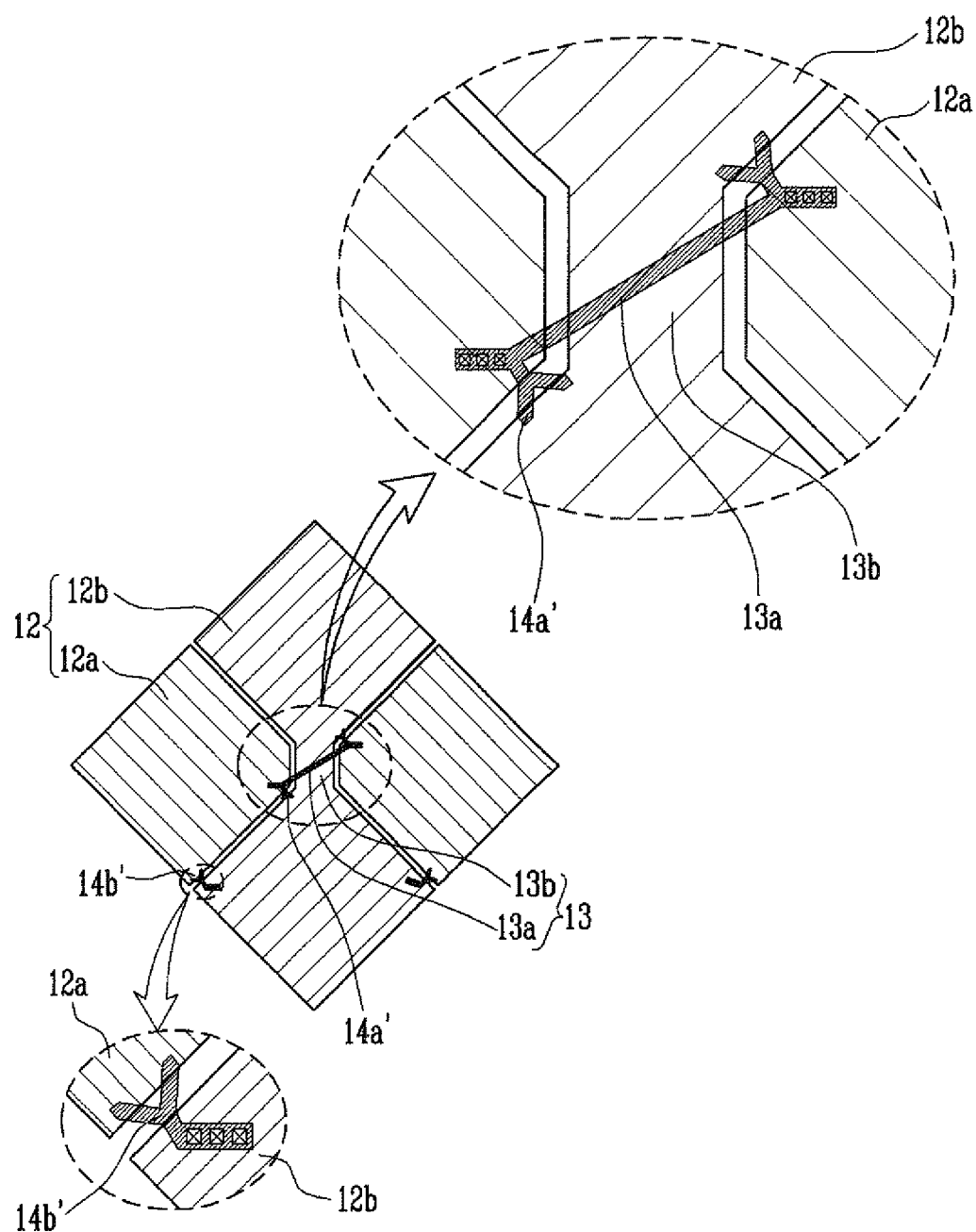
FIG. 7 is a plan view showing sensing cells, connection patterns and static electricity induction patterns of a touch screen panel according to a third embodiment of the present invention.
Figure 8:
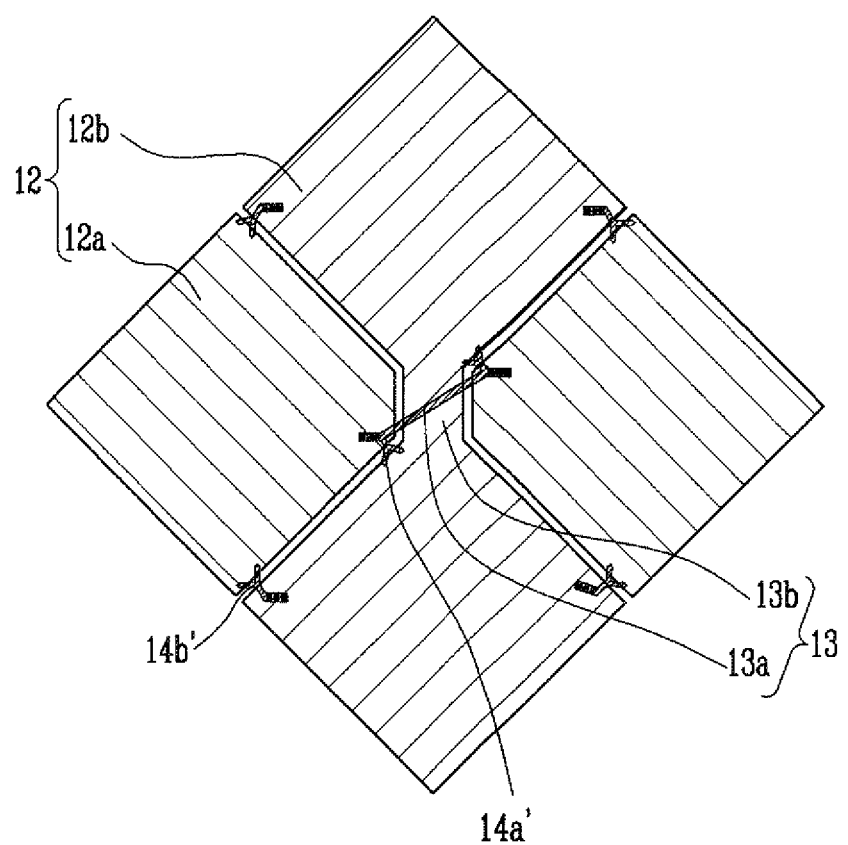
FIGS. 8 and 9 are plan views showing modifications of the static electricity induction patterns shown in FIG. 7.
Figure 9:
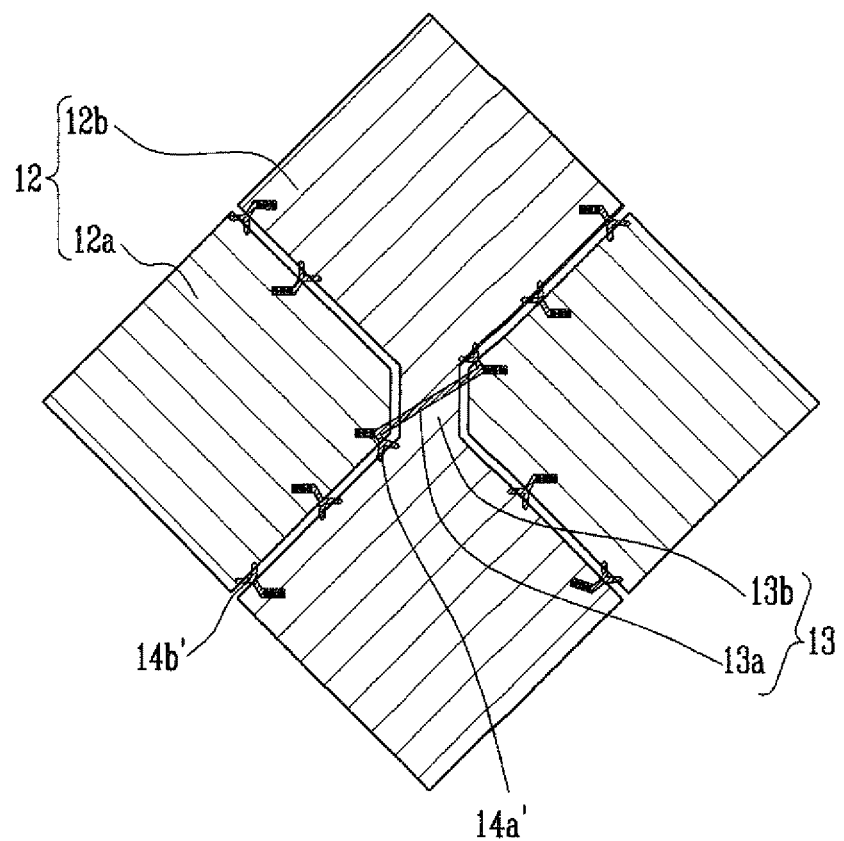

FIG. 7 is a plan view showing sensing cells, connection patterns and static electricity induction patterns of a touch screen panel according to a third embodiment of the present invention; and FIGS. 8 and 9 are plan views showing modifications of the static electricity induction patterns shown in FIG. 7. In the description of FIGS. 7 thru 9, components identical or similar to those of FIG. 2 are designated by the same reference numerals, and their detailed descriptions will be omitted.

Referring to FIG. 7, the touch screen panel according to this embodiment includes not only integrated static electricity induction patterns 14a' integrally formed with each of the first connection patterns 13a, but also separated static electricity induction patterns 14b' formed so as to be separated from each of the first connection patterns 13a.

In this instance, the integrated static electricity induction patterns 14a' are connected to the respective first sensing cells 12a so as to induce static electricity, generated from an X-line on which the first sensing cells 12a are arranged, into capacitors formed between the integrated static electricity induction patterns 14a' and the second sensing cells 12b.

For example, the separated static electricity induction patterns 14b' are connected to each of the second sensing cells 12b so as to induce static electricity generated from a Y-line, on which the second sensing cells 12a are arranged, into capacitors formed between the separated static electricity induction patterns 14b' and the first sensing cells 12a.

That is, in this embodiment, the plurality of static electricity induction patterns 14a' and 14b' are not formed into a unidirectional structure, but are formed into a bidirectional structure, so that driving failure of the touch screen panel can be more effectively prevented.

In this embodiment, the separated static electricity induction patterns 14b' are positioned relatively free, and may be uniformly distributed and arranged so as to be spaced apart from the first and second connection patterns 13a and 13b, respectively, in the touch active area.

For example, the separated static electricity induction patterns 14b' may be disposed at an end portion different from a connection portion of each of the first and second sensing cells 12a and 12b, respectively, i.e., an end portion connected by each of the first and second connection patterns 13a and 13b, respectively, of the first and second sensing cells 12a and 12b, respectively.

Meanwhile, in addition to the forming positions of the separated static electricity induction patterns 14b', the sensing cell 12a or 12b, to which the separated static electricity induction patterns 14b' and the number of the separated static electricity induction patterns 14b' are disposed, may be variously modified.

For example, as shown in FIG. 8, when the integrated static electricity induction patterns 14a' form two static electricity induction paths in X-axis and Y-axis directions at both ends of the first connection pattern 13a, respectively, the separated static electricity induction patterns 14b' may be distributively formed at four corners so as to form four static electricity induction paths in the X-axis and Y-axis directions.

As shown in FIG. 9, in order to form additional static electricity induction paths in the X-axis and Y-axis directions, there may be additionally formed separated static electricity induction patterns 14b' connected to the first sensing cells 12a so as to form capacitors with the second sensing cells 12b.

As described above, according to the embodiments of the invention, the plurality of static electricity induction patterns 14a' and 14b' are formed in both directions so that it is possible to more effectively prevent driving failure of the touch screen panel due to the static electricity.

While the present invention has been described in connection with certain exemplary embodiments, it is to be understood that the invention is not limited to the disclosed embodiments but, on the contrary, is intended to cover various modifications and equivalent arrangements included within the spirit and scope of the appended claims, and equivalents thereof.

What is claimed is:

1. A touch screen panel, comprising:
    a transparent substrate;
    a plurality of first sensing cells connected along a first direction on the transparent substrate, and a plurality of second sensing cells disposed between the respective first sensing cells and connected along a second direction;
    a plurality of first connection patterns which connect the first sensing cells along the first direction;
    a plurality of second connection patterns which connect the second sensing cells along the second direction;
    a plurality of static electricity induction patterns, each static electricity induction pattern being connected to one of the first sensing cells or one of the second sensing cells, and extending in a direction toward a sensing cell immediately adjacent to a sensing cell to which said each static electricity induction pattern is connected so that an end portion thereof overlaps the adjacent sensing cell; and
    a first insulating layer interposed between the first and second connection patterns and between said each static electricity induction pattern and the adjacent sensing cell.

2. The touch screen panel according to claim 1, wherein the first connection patterns have patterns separated from the first sensing cells and connect the first sensing cells in a line along the first direction while being electrically connected to the first sensing cells at one of an upper portion and a lower portion of the first sensing cells.

3. The touch screen panel according to claim 2, wherein the static electricity induction patterns are formed of a same material and in a same layer as the first connection patterns.

4. The touch screen panel according to claim 2, wherein each of the static electricity induction patterns diverges from one region of a first connection pattern so that the static electricity induction patterns are integrally formed with the first connection pattern.

5. The touch screen panel according to claim 4, wherein two of the static electricity induction patterns diverge from the one region of the first connection pattern so that the static electricity induction patterns are integrally formed with the first connection patterns.

6. The touch screen panel according to claim 2, wherein the first connection patterns are connected to the first sensing cells through first contact holes formed in the first insulating layer at said one of the upper portion and the lower portion of the first sensing cells.

7. The touch screen panel according to claim 6, wherein each of the static electricity induction patterns diverges from a region of the first connection pattern, said first contact holes being formed in said region of the first connection pattern, so that the static electricity induction patterns are integrally formed with the first connection pattern.

8. The touch screen panel according to claim 2, wherein the static electricity induction patterns are disposed in a same layer as the first connection patterns, and have patterns separated from the first connection patterns.

9. The touch screen panel according to claim 8, wherein the static electricity induction patterns are formed of a same material as the first connection patterns.

10. The touch screen panel according to claim 8, wherein the static electricity induction patterns are disposed adjacent to the first connection pattern and a connection portion of the first sensing cells.

11. The touch screen panel according to claim 8, wherein the first connection patterns are electrically connected to the first sensing cells through first contact holes formed in the first insulating layer at one of an upper portion and a lower portion of the first sensing cells, and the static electricity induction patterns are electrically connected to one of the first sensing cells and the second sensing cells through second contact holes formed in the first insulating layer at one of an upper portion and a lower portion of said one of the first sensing cells and the second sensing cells.

12. The touch screen panel according to claim 11, wherein the first and second contact holes are disposed adjacent to each other, and the number of second contact holes which connect one of the first sensing cell and the second sensing cell to one of the static electricity induction patterns is set to be greater than a number of the first contact holes which connect one of the first sensing cells to one of the first connection patterns.

13. The touch screen panel according to claim 8, wherein the static electricity induction patterns are spaced apart from the first and second connection patterns by at least a predetermined distance.

14. The touch screen panel according to claim 13, wherein the static induction patterns are disposed at end portions different from end portions of the first and second sensing cells connected by the first and second connection patterns.

15. The touch screen panel according to claim 1, wherein the static electricity induction patterns comprise first static electricity induction patterns connected to the first sensing cells so as to extend in a direction toward a second sensing cell adjacent to a first sensing cell to which each of the first static electricity induction patterns is connected, and second static electricity induction patterns connected to the second sensing cells so as to extend in a direction toward a first sensing cell adjacent to a second sensing cell to which each of the second static electricity induction patterns is connected.

16. The touch screen panel according to claim 1, further comprising outer lines for connecting the first sensing cells in a line along the first direction and the second sensing cells in a line along the second direction to an external driving circuit;
wherein the first connection patterns and the static electricity induction patterns are formed of a same material in a same layer as the outer lines.

17. The touch screen panel according to claim 16, wherein the outer lines, the first connection patterns and the static electricity induction patterns are formed of a metallic material.

18. The touch screen panel according to claim 1, wherein the first sensing cells, the second sensing cells and the second connection patterns are formed of a transparent electrode material, and the first connection patterns and the static electricity induction patterns are formed of an opaque metallic material so as to have a narrower width than the second connection patterns.

19. The touch screen panel according to claim 1, wherein the transparent substrate is an upper substrate of a display panel so as to be integrally formed with the display panel.

20. The touch screen panel according to claim 19, wherein the first insulating layer is an inorganic insulating layer entirely formed on a touch active area in which the first and second sensing cells are formed.

* * * * *